United States Patent
Kikuchi et al.

(10) Patent No.: US 6,212,571 B1
(45) Date of Patent: *Apr. 3, 2001

(54) SERVER

(75) Inventors: Yoshihide Kikuchi; Satoru Kaneda, both of Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/811,160

(22) Filed: Mar. 4, 1997

(51) Int. Cl.$^7$ .............. G06F 15/16; G06F 15/17
(52) U.S. Cl. ............ 709/248; 711/118; 709/219
(58) Field of Search .................. 395/500, 200.09, 395/601, 200.48, 328, 800.7; 370/522, 60.1, 516, 395; 348/8, 7; 455/4.2; 711/118, 162; 709/219, 225, 231, 248, 203; 273/94; 386/124; 713/200; 345/421, 422

(56) References Cited

U.S. PATENT DOCUMENTS

| | | | |
|---|---|---|---|
| 4,993,025 | 2/1991 | Vesel et al. | 370/94 |
| 5,442,749 | 8/1995 | Northcutt et al. | 395/200.09 |
| 5,462,275 * | 10/1995 | Lowe et al. | 273/94 |
| 5,555,244 * | 9/1996 | Gupta et al. | 370/60.1 |
| 5,610,841 * | 3/1997 | Tanaka et al. | 709/219 |
| 5,640,194 * | 6/1997 | Suzuki et al. | 348/7 |
| 5,664,214 * | 9/1997 | Taylor et al. | 395/800.2 |
| 5,671,377 * | 9/1997 | Bleidt et al. | 395/328 |
| 5,737,747 * | 4/1998 | Vishlitzky et al. | 711/118 |
| 5,761,417 * | 6/1998 | Henley et al. | 395/200.09 |
| 5,829,046 * | 10/1998 | Tzelnic et al. | 711/162 |
| 5,920,702 * | 7/1999 | Bleidt et al. | 709/231 |
| 5,923,817 * | 7/1999 | Nakamura | 386/124 |
| 5,933,603 * | 8/1999 | Vahalia et al. | 709/225 |
| 5,966,387 * | 10/1999 | Cloutier | 370/516 |
| 6,006,274 * | 12/1999 | Hawkins et al. | 709/248 |
| 6,009,457 * | 12/1999 | Moller | 709/203 |
| 6,014,706 * | 1/2000 | Cannon et al. | 709/231 |
| 6,111,582 * | 8/2000 | Jenkins | 345/421 |

FOREIGN PATENT DOCUMENTS

| | | |
|---|---|---|
| 3-185948 | 8/1991 | (JP) . |
| 6-236330 | 8/1994 | (JP) . |
| 6-237451 | 8/1994 | (JP) . |
| 7274107 | 10/1995 | (JP) . |

OTHER PUBLICATIONS

H. Oka, et al., "Video Server With NFS and TCP/IP Expanded to Handle Moving Pictures", Nikkei Electronics, No. 645, Sep. 25, 1995, pp. 133–141, 132.

Korean Office Action issued 9/27/99 in a related application. Japanese–language translation of Korean Office Action issued 9/27/99.

English–language translation of the Korean Office issued 9/27/99.

* cited by examiner

*Primary Examiner*—Mark H. Rinehart
*Assistant Examiner*—Thong Vu
(74) *Attorney, Agent, or Firm*—Ostrolenk, Faber, Gerb & Soffen, LLP

(57) ABSTRACT

The invention provides a server wherein a plurality of unit servers are arranged in parallel to each other to allow an increase in the number of clients and continuous data that can be transferred without interruption to clients using a comparatively small number of buffers. A video server includes unit servers including a file apparatus having video data stored discretely therein. When a preparation sign reporting section of a unit server reports a sign, a file read-out section of the unit server reads out the video data and stores them in a buffer, and in response to a sign of a distribution start sign reporting section, a distribution section starts distribution of the video data. A predetermined number of unit servers repeat reading out and distribution of discretely stored video data cyclically at timings set for them in this manner. Consequently, the buffers can be utilized effectively to effect distribution without interruption.

10 Claims, 12 Drawing Sheets

FIG. 6

| CLIENT NUMBER | IMAGE NUMBER | IMAGE BLOCK NUMBER | READ-OUT TIME | DISTRIBUTION START TIME |
|---|---|---|---|---|
| 381 | 001 | 000 | 18:10.21 | 18:10.22 |
| 382 | 125 | 016 | 18:10.24 | 18:10.25 |
| .... | .... | .... | .... | .... |
| | | | | |

SERVER

BACKGROUND OF THE INVENTION

1. Field of the Invention

This invention relates to a server which transfers, for example, continuous data such as video data in response to a request from a client, and more particularly to a server effectively used with a communication system wherein a plurality of servers are coupled to each other by a network and continuous data of an image file or the like are stored discretely in the servers.

2. Description of the Related Art

Continuous data represented by video data are required to be transferred without interruption to a client. Japanese Patent Laid-Open Application No. Heisei 3-185948 or No. Heisei 6-236330 discloses a system which transfers video data via a network. Further, a server for use with a system of the type just mentioned is conventionally known and disclosed, for example, in Nikkei Electronics, No. 645, pp.133–141. The server disclosed in the document just mentioned will be hereinafter referred to as first prior art.

FIG. 8 shows a communication system in which the server of the first prior art Is employed. Referring to FIG. 8, the communication system shown includes a video server 101 for distributing video data, a plurality of clients $102_1$ to $102_N$, and a network 103 which interconnects the video server 101 and the clients $102_1$ to $102_N$. The video server 101 includes a file apparatus 111 for storing video data. The video data stored in the file apparatus 111 are read out by a file read-out section 112 and temporarily stored into a buffer 113, and then sent out to the network 103 by a distribution section 114.

If a request for video data is received from one of the clients $102_1$ to $102_N$, then the video server 101 reads out relevant data from the file apparatus 111 and temporarily stores the data into the buffer 113. It is assumed now that a request for video data is developed from the client $102_1$. The video data in the buffer 113 are successively sent to the distribution section 114 and then sent via the network 103 to and reproduced by the client $102_1$.

In the communication system employing the server of the first prior art, the buffer is used so that video data as continuous data may be distributed without interruption from the video server 101 to the clients $102_1$ to $102_N$ side, and the buffer capacity of the buffer 113 on the video server 101 side is set to a rather high capacity in order to reduce the buffer capacity on the clients $102_1$ to $102_N$ side. Accordingly, the video server 101 is constructed such that it need not access the file apparatus 111 every time a request is received from any of the clients $102_1$ to $102_N$.

The communication system employing the server of the first prior art described above is subject to restriction in number of clients ($102_1$ to $102_N$) to which video data are to be supplied from a relationship to an upper limit to the capacity of a work station which constructs the video server. In order to solve this problem, two countermeasures are available: one is to raise the upper limit to the capacity of a work station, and the other is to use a plurality of video servers which operate in parallel to each other. The countermeasure to raise the upper limit to the capacity of a work station requires development of a new server having a higher capacity. On the other hand, the countermeasure to use a plurality of video servers which operate in parallel to each other is advantageous in that existing comparatively inexpensive work stations can be used for the video servers.

FIG. 9 shows a system wherein a plurality of video servers operate in parallel to each other. The system will be hereinafter referred to as second prior art. In FIG. 9, like elements are denoted by like reference symbols to those of FIG. 8, and overlapping description of those elements is omitted herein to avoid redundancy. Referring to FIG. 9, the system shown includes a video server 121 which in turn includes totaling M first to Mth unit servers $122_1$ to $122_M$. The unit servers $122_1$ to $122_M$ include, similarly as in the video server 101 of FIG. 8, file apparatus $111_1$ to $111_M$, file read-out sections $112_1$ to $112_M$, buffers $113_1$ to $113_M$, and distribution sections $114_1$ to $114_M$, respectively. Video data are stored discretely in units of a block in the file apparatus $111_1$ to $111_M$ of the unit servers $122_1$ to $122_M$.

For example, in order for the first client $102_1$ to reproduce video data, the communication system having the construction described above operates in the following manner. It is assumed that the first client $102_1$ sends a request for video data for one second to the first unit server $122_1$. In response to the request, the file read-out section $112_1$ delivers a file read-out command to the first file apparatus $111_1$. The first file apparatus $111_1$ reads out relevant video data in response to the file read-out command and stores the video data once into the first buffer $113_1$. Then, the first distribution section $114_1$ transmits the thus stored video data to the first client $102_1$ via the network 103.

The first client $102_1$ reproduces the video data sent thereto while it sends a next read-out request to the next unit server $122_2$. In this manner, each of the clients $102_1$ to $102_N$ successively sends a request to the unit servers $122_1$ to $122_M$ to reproduce the video data which are continuous as a whole. The communication system which employs the server of the second prior art is advantageous in that the number of clients ($102_1$ to $102_N$) can be increased using inexpensive file apparatus ($111_1$ to $111_M$) or work stations.

By the way, the amount of video data is generally very large. Therefore, a hard disk is usually used for file storage apparatus. However, the hard disk employs mechanical operating members in order to read out data. Therefore, after a file read-out command is received, a waiting time such as a time for a seeking operation of a head and/or a latency time is required and object information cannot be read out immediately.

According to the communication system employing the server of the first prior art described hereinabove with reference to FIG. 8, in order to cover the waiting time, a buffer having a comparatively large capacity is used for the buffer 113 in the video server 101. In particular, a comparatively large amount of video data including relevant video data is read out by a one time access to the file apparatus 111 such as a hard disk and is stored at a time into the buffer 113 having a comparatively large capacity. Then, when a request for video data following the relevant video data is received from the client 102, the file apparatus 111 is not accessed, but the requested video data are transferred immediately from within the stored contents of the buffer 113. Consequently, otherwise possible interruption of images on the client 102 side is prevented.

However, if the server of the second prior art described hereinabove with reference to FIG. 9 is used in order to increase the number of clients, a considerably long time elapses before an access is received from the same client. It is assumed that the video server 121 includes, for example, totaling 100 first to one hundredth unit servers $122_1$ to $122_{100}$. If it is assumed that each of the unit servers $122_1$ to $122_{100}$ transfers data for one second, then 100 seconds elapse before a certain one of the unit servers $122_1$ to $122_{100}$ is accessed for the next time from the same one of the clients $102_1$ to $102_N$. Besides, if it is assumed that each one of the unit servers $122_1$ to $122_{100}$ supports, for example, 40 clients in average, then it requires a buffer having a capacity for 40 times 1,000 seconds. In this manner, the system which transfers video data without interruption to a desired client using the server of the second prior art is disadvantageous in that it requires a high cost.

SUMMARY OF THE INVENTION

It is an object of the present invention to provide a server wherein a plurality of unit servers are arranged in parallel to each other to allow an increase in number of clients and continuous data can be transferred without interruption to clients using a comparatively small number of buffers.

In order to attain the object described above, according to an aspect of the present invention, there is provided a server comprising a plurality of unit servers connected to a network together with a plurality of clients and having a file, in which continuous data are accommodated, stored discretely in units of a predetermined data amount therein, each of the unit servers including a file apparatus in which the discrete continuous data are stored, file read-out means for reading out the continuous data successively by the predetermined data amount from the file apparatus, a buffer for temporarily storing the continuous data read out by the file read-out means at the shortest until transfer of the stored continuous data comes to an end, transfer means for transferring the continuous data stored in the buffer to one of the clients, from which a request for the file has been received, via the network, transfer start sign reporting means for reporting a timing, at which the continuous data stored in the file apparatus are to be transferred, to the transfer means based on an order in which the continuous data stored discretely in the unit servers are to be transferred, and preparation sign reporting means for reporting a timing, at which the continuous data are to be read out from the file apparatus, to the file read-out means so that, prior to starting of transfer of the continuous data by the unit server, the continuous data may be stored by the predetermined data mount in the buffer.

In the server, the plurality of unit servers are provided to discretely and cyclically store continuous data individually by the predetermined data amount, and each of the unit servers reads out the continuous data successively by the predetermined data amount from the file apparatus, temporarily stores them and transfers them to one of the clients, from which a request for the file has been received. Here, upon reading out from the file apparatus, the transfer start sign reporting means reports the reading out timing, and upon transfer of the continuous data stored in the buffer, the preparation sign reporting means reports the transfer timing. The unit servers can read out the discretely stored continuous data, store them into the buffers and transfer them in a predetermined order by the predetermined amount, and consequently, the continuous data can be transferred without interruption to the client. Besides, since the buffer of each of the unit servers can process the continuous data successively by the predetermined data amount, those data which are not necessary any more because transfer of them is completed can be erased from the buffer and following continuous data of the predetermine data amount can be stored into the buffer. Accordingly, a device having a comparatively small storage capacity can be used for the buffer.

With the buffer, since buffers having a capacity equal to an amount of data to be transferred by one transferring operation are prepared in individual unit servers for successively transferring continuous data to a client and are successively used to repeat writing of the continuous data and reading out of the continuous data for transfer, even if the amount of the continuous data is large, the continuous data can be transferred without interruption to a client using the minimized number of buffers. Consequently, the buffer can be constructed economically. Further, although an increase in number of unit servers generally gives rise to a lack in logical network resources, since the server of the present invention can use network resources when this becomes necessary, the server is advantageous also in that minimized network resources are required.

According to another aspect of the present invention, there is provided a server comprising a plurality of unit servers connected to a network together with a plurality of clients and having a file, in which video data are accommodated, stored discretely and cyclically in units of a predetermined data amount therein, each of the unit servers including a file apparatus in which the discrete video data are stored, file read-out means for reading out the video data successively by the predetermined data amount from the file apparatus, a buffer for temporarily storing the video data read out by the file read-out means at the shortest until distribution of the stored video data comes to an end, distribution means for distributing the video data stored in the buffer to one of the clients, from which a request for the file has been received, via the network, distribution start sign reporting means for reporting a timing, at which the video data stored in the file apparatus are to be distributed, to the distribution means based on an order in which the video data stored discretely in the unit servers are to be distributed, and preparation sign reporting means for reporting a timing, at which the video data are to be read out from the file apparatus, to the file read-out means so that, prior to starting of distribution of the video data by the unit server, the video data may be stored by the predetermined data mount in the buffer.

In the server, the plurality of unit servers are provided to discretely and cyclically store video data individually by the predetermined data amount or to control such storage of video data based on a table in which an order is described, and each of the unit servers reads out the video data successively by the predetermined data amount from the file apparatus, temporarily stores them and distributes them to one of the clients, from which a request for the file has been received. Here, upon reading out from the file apparatus, the distribution start sign reporting means reports the reading out timing, and upon distribution of the video data stored in the buffer, the preparation sign reporting means reports the distribution timing. The unit servers can read out the discretely stored video data, store them into the buffers and distribute them in a predetermined order by the predetermined amount, and consequently, the video data can be distributed without interruption to the client. Besides, since the buffer of each of the unit servers can process the video data successively by the predetermined data amount, those data which are not necessary any more since distribution of them is completed can be erased from the buffer and following video data of the predetermine data amount can be stored into the buffer. Accordingly, a device having a comparatively small storage capacity can be used for the buffer.

With the buffer, since buffers having a capacity equal to an amount of data to be distributed by one distribution operation are prepared in individual unit servers for successively distributing video data as a kind of continuous data to a client and are successively used to repeat writing of the video data and reading out of the video data for distribution, even if the amount of the video data is large, the video data can be distributed without interruption to a client using the minimized number of buffers. Consequently, the buffer can be constructed economically. Besides, a required number of buffers may be allocated immediately prior to distribution of the video data. In particular, with a conventional server, if it is assumed that it includes 100 unit servers, then buffers for 100 seconds must be prepared for each stream. However, with the buffer of the present aspect of the invention, only buffers for 2 seconds may be allocated for preparation for reading out and distribution. Consequently, the server of the discrete storage type can be constructed with a very small memory capacity. Further, although an increase in number of unit servers generally gives rise to a lack in logical network resources, since the server of the present invention can use network resources when this becomes necessary, the server is advantageous also in that minimized network resources are required.

The server may be constructed such that each of the unit servers includes time synchronization means for synchronizing times of the unit servers with each other, and the distribution start sign reporting means and the preparation sign reporting means output the respective reports based on the time synchronized by the time synchronization means.

Since the unit servers are individually connected to the network, in order that the unit servers may successively distribute data by the predetermined amount at good timings to a client, the unit servers must use the same clock among them. Thus, each of the unit servers includes time synchronization means for synchronizing times of the unit servers with each other, and the distribution start sign reporting means and the preparation sign reporting means individually perform reporting at accurate timings in the unit server. Consequently, even if the network is very large or the positions of the individual unit servers on the network are spaced by a large distance from each other, such reports as mentioned above can be delivered at accurate timings in the individual unit servers.

In this instance, the server may be constructed such that the preparation sign reporting means and the distribution start sign reporting means commonly include the time synchronization means as well as a table in which a time at which a report is to be outputted is described, table checking means for checking the table after each predetermined interval of time based on the time synchronized by the time synchronization means, report outputting means for outputting, when the time described in the table comes, a relevant report, and description updating means for rewriting the description of the table to a time at which another report is to be outputted. Since the preparation sign reporting means and the distribution start sign reporting means are formed from the common members, the server can be constructed economically. Further, since the two means use the table commonly and check it to output individual reports at relevant times, the reports can be outputted in a timed relationship from each other. Furthermore, since the description updating means is provided, the table can be produced in a comparatively small size and hence at a comparatively low cost.

The server may alternatively be constructed such that each of the unit servers further includes distribution end notification means for reporting an end of distribution of the video data by the predetermined data amount by the distribution means to the other unit servers, and distribution start sign reporting means for reporting, when an end of distribution is reported from the distribution end notification means of one of the unit servers which performs distribution immediately before then, a distribution start sign to cause the self unit server to which the distribution start sign reporting means belongs to start distribution of the video data by the predetermined amount.

In the server, when the unit servers are to distribute video data cyclically in an order determined in advance, one of the unit servers which completes it distribution reports this to another one of the unit servers which is to perform distribution subsequently. Consequently, reporting of distribution can be performed reasonably. Besides, in this instance, if distribution of the first unit server comes to an end before a possible maximum time elapses, the second server can start its distribution earlier accordingly, and the total time required for distribution of the entire video data to a client can be reduced as much.

In this instance, the server may be constructed such that each of the unit servers further includes preparation sign notification means for reporting, when a report of an end of distribution is received from the distribution end reporting means of any other one of the unit servers, a timing at which the video data are to be read out from the file apparatus of the self unit server from the time of the reception of the report, and second distribution start sign notification means for delivering, when a report of an end of distribution is received from the distribution end reporting means of any other one of the unit servers, a report to start distribution of the video data of the self unit server from the time of the reception of the report. Thus, reading out of a file from the file apparatus can be started earlier similarly as described above, and the server can achieve distribution control with a generally higher efficiency.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 6 is a diagrammatic view showing an example of a stream table used in the server of FIG. 1;

DESCRIPTION OF THE PREFERRED EMBODIMENT

Figure 1:
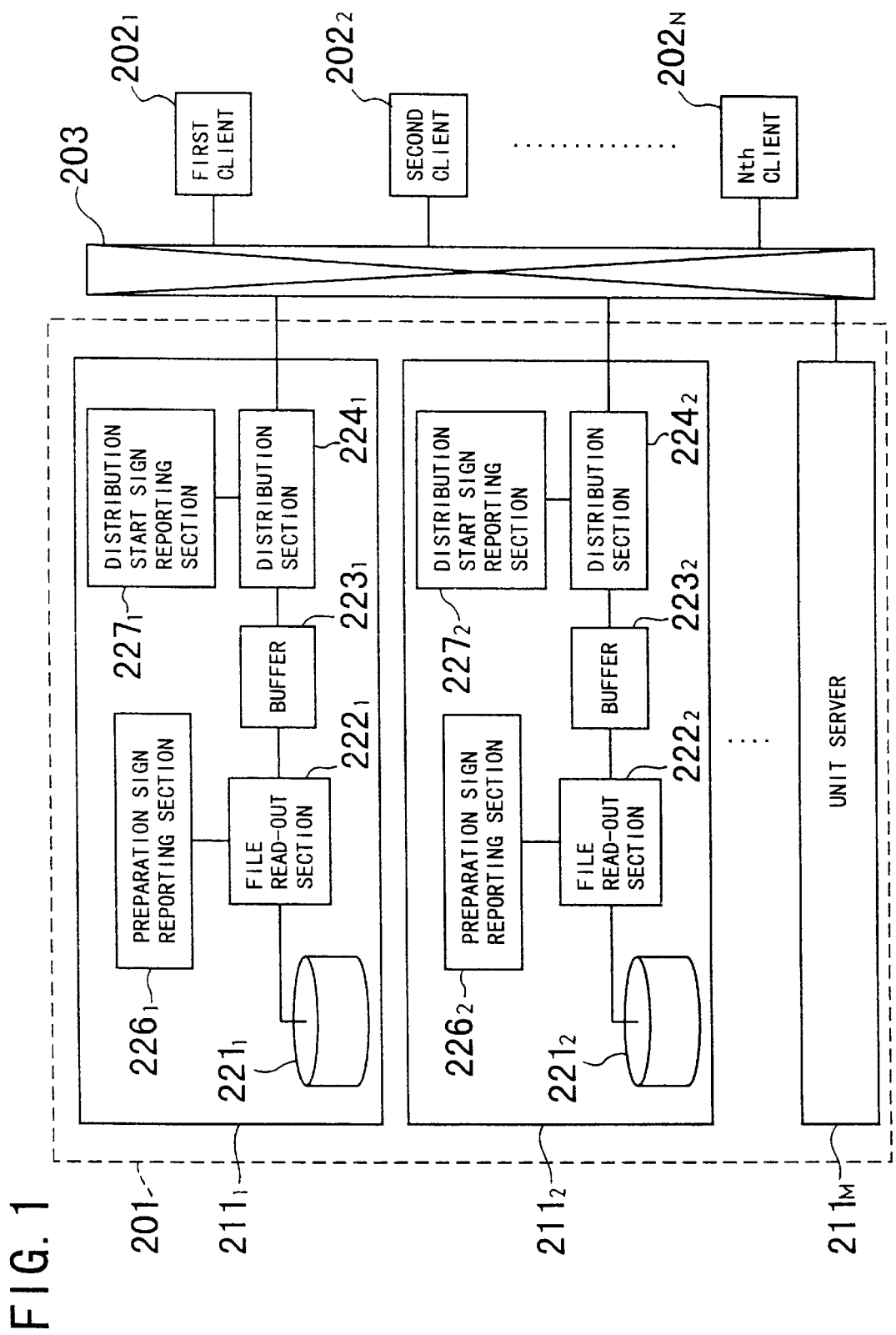
FIG. 1 is a block diagram showing a video server according to a preferred embodiment of the present invention and an outline of a communication system which employs the video server.

Referring first to FIG. 1, there are shown a video server as a server according to a preferred embodiment of the present invention and an outline of a communication system which employs the video server. The video server of the present embodiment is generally denoted at 201 and connected to a network 203 together with first to Nth clients $202_1$ to $202_N$.

The video server 201 includes totaling M first to Mth unit servers $211_1$ to $211_M$. The unit servers $211_1$ to $211_M$ have a same construction as each other and each includes a file apparatus 221 ($221_1$, $221_2$, ...) for storing video data. The file apparatus 221 is read out by a file read-out section 222 ($222_1$, $222_2$, ...) and temporarily stored into a buffer 223 ($223_1$, $223_2$, ...), whereafter it is sent out to the network 203 by a distribution section 224 ($224_1$, $224_2$, ...). A preparation sign reporting section 226 ($226_1$, $226_2$, ...) is connected to the file read-out section 222 so that a sign of preparation for reading out of the file apparatus 221 may be reported. Further, a distribution start sign reporting section 227 ($227_1$, $227_2$, ...) is connected to the distribution section 224 so that a sign of start of distribution of data to the network 203 may be reported.

It is to be noted that the file apparatus 221 in each of the totaling M first to Mth unit servers $211_1$ to $211_N$ is formed from, for example, a hard disk, and the buffer 223 is formed from, for example, a random access memory (RAM). Meanwhile, all or some of the other components such as the preparation sign reporting section 226 and the distribution start sign reporting section 227 can be formed from a central processing unit (CPU), a read only memory (ROM) in which predetermined programs are stored, and computer elements such as a RAM for use as a working memory, all not shown.

Operation of the video server 201 having the construction described above when it distributes video data to one of the first to Nth clients $202_1$ to $202_N$ will be described below.

First, a process of storing video data of one file into the video server 201 will be described. Video data for one file are delimited into blocks of a suitable size, for example, of a length for one second, and the blocks are successively numbered with serial numbers beginning with "0".

Figure 2A:
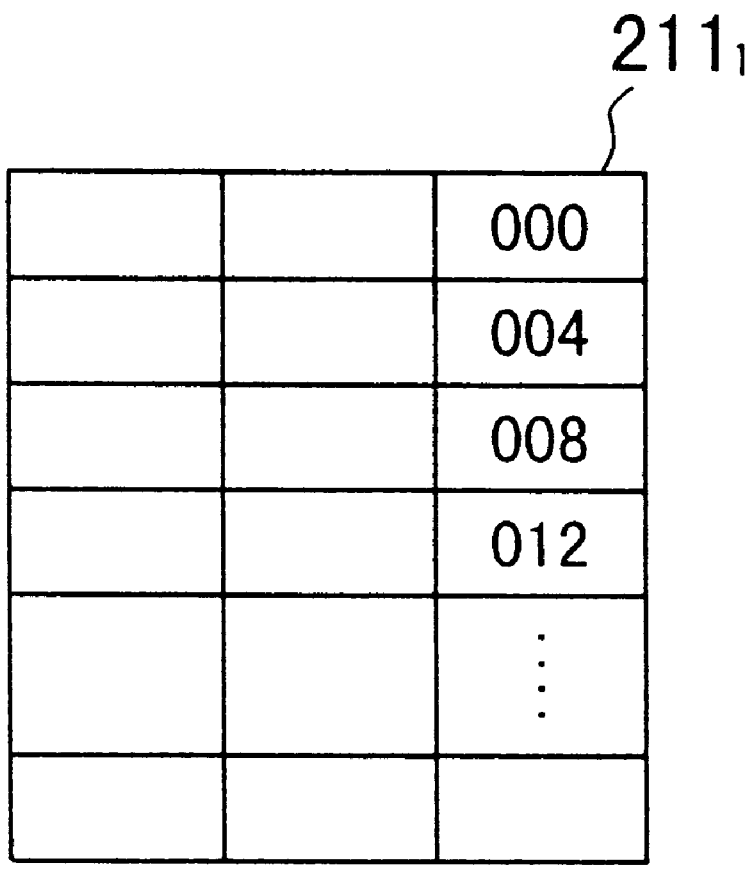
FIGS. 2(a) to 2(d) are diagrammatic views illustrating a manner in which delimited video data are accommodated cyclically in first to fourth unit servers, respectively.
Figure 2B:
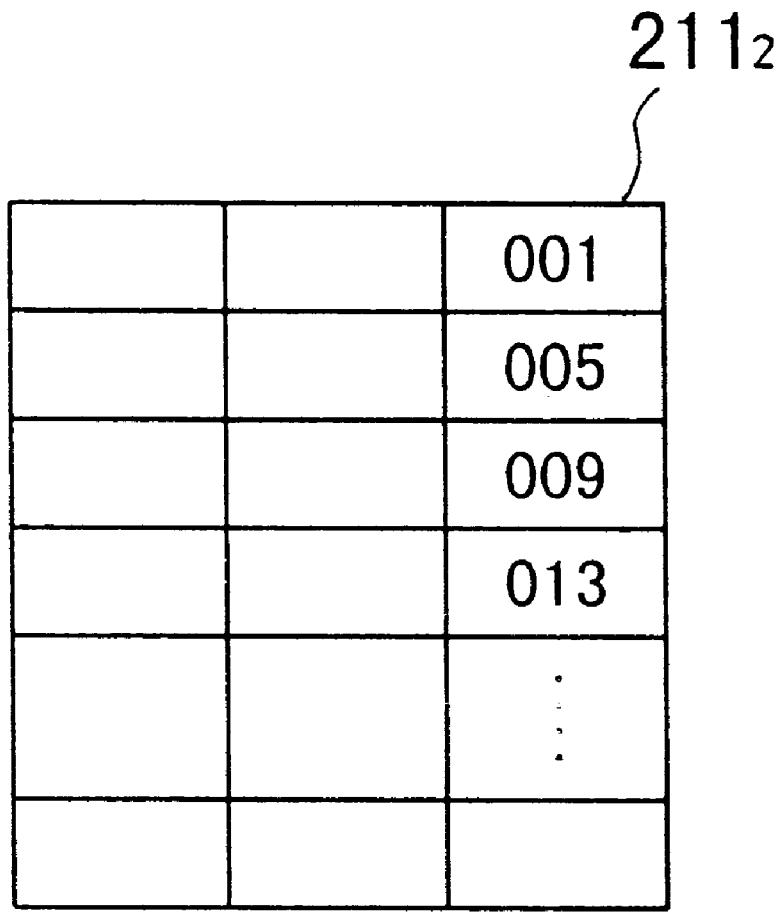
Figure 2C:
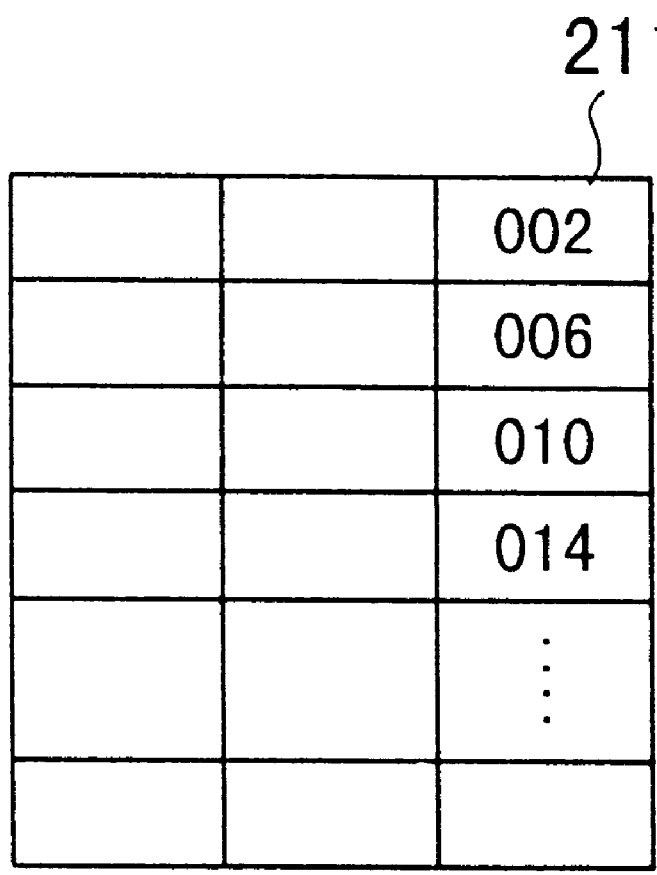
Figure 2D:
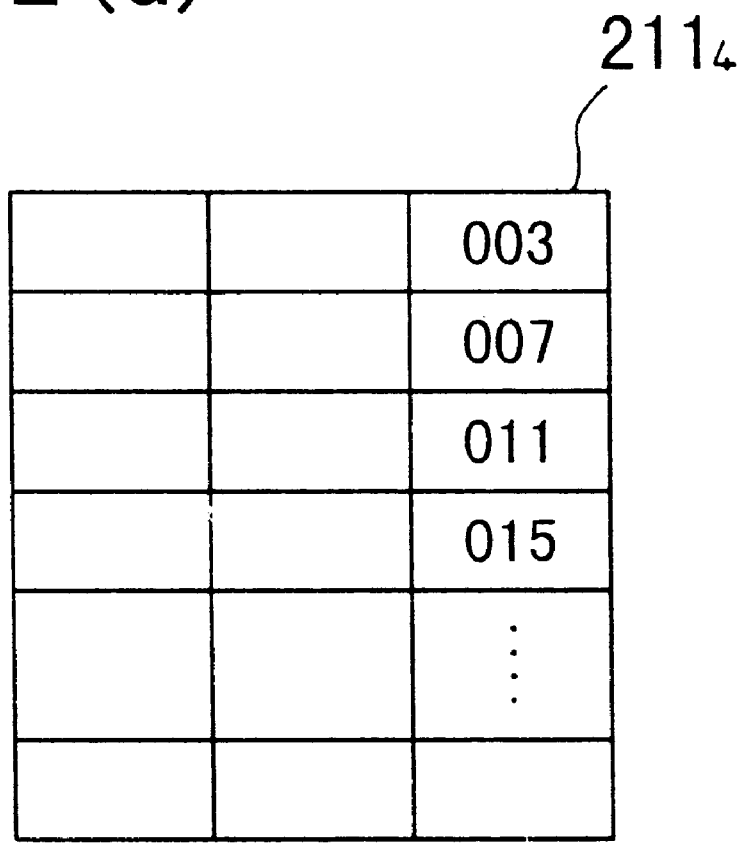

FIGS. 2(a) to 2(d) illustrate a manner in which the delimited video data are cyclically stored in the first to fourth unit servers. In particular, FIG. 2(a) illustrates a stored condition of moving pictures in the first unit server $211_1$; FIG. 2(b) illustrates a stored condition of moving pictures in the second unit server $211_2$; FIG. 2(c) illustrates a stored condition of moving pictures in the third unit server $211_3$; and FIG. 2(d) illustrates a stored condition of moving pictures in the fourth unit server $211_4$. The video data for the first one second are stored with the serial number of "000" in the first unit server $211_1$; the video data for the second one second are stored with the serial number of "001" in the second unit server $211_2$; the video data for the third one second are stored with the serial number of "002" in the third unit server $211_3$; and the video data for the fourth one second are stored with the serial number of "003" in the fourth unit server $211_4$. The video data for the fifth one second are stored with the serial number of "004" back again in the first unit server $211_1$. The other data are successively stored in a similar manner as described above.

Since the video data are successively and cyclically stored into the first to fourth unit servers $211_1$ to $211_4$ in this manner, in which one of the first to fourth unit servers $211_1$ to $211_4$ the video data for the nth one second are stored can be determined by calculating the remainder i when the value n is divided by the value "4". This is represented by the following expression (1):

$$i = (n \bmod 4) \tag{1}$$

In the expression (1) above, if i is "0", then the video data are stored in the first unit server $211_1$; if i is "1", then the video data are stored in the second unit server $211_2$; if i is "2", then the video data are stored in the third unit server $211_3$; and if i is "3", then the video data are stored in the fourth unit server $211_4$.

The video data stored discretely in the unit servers $211_1$ to $211_4$ as described above are successively transferred, as the unit servers $211_1$ to $211_4$ successively perform reading out and distribution of the file, for example, to the first client $202_1$.

Figure 3:
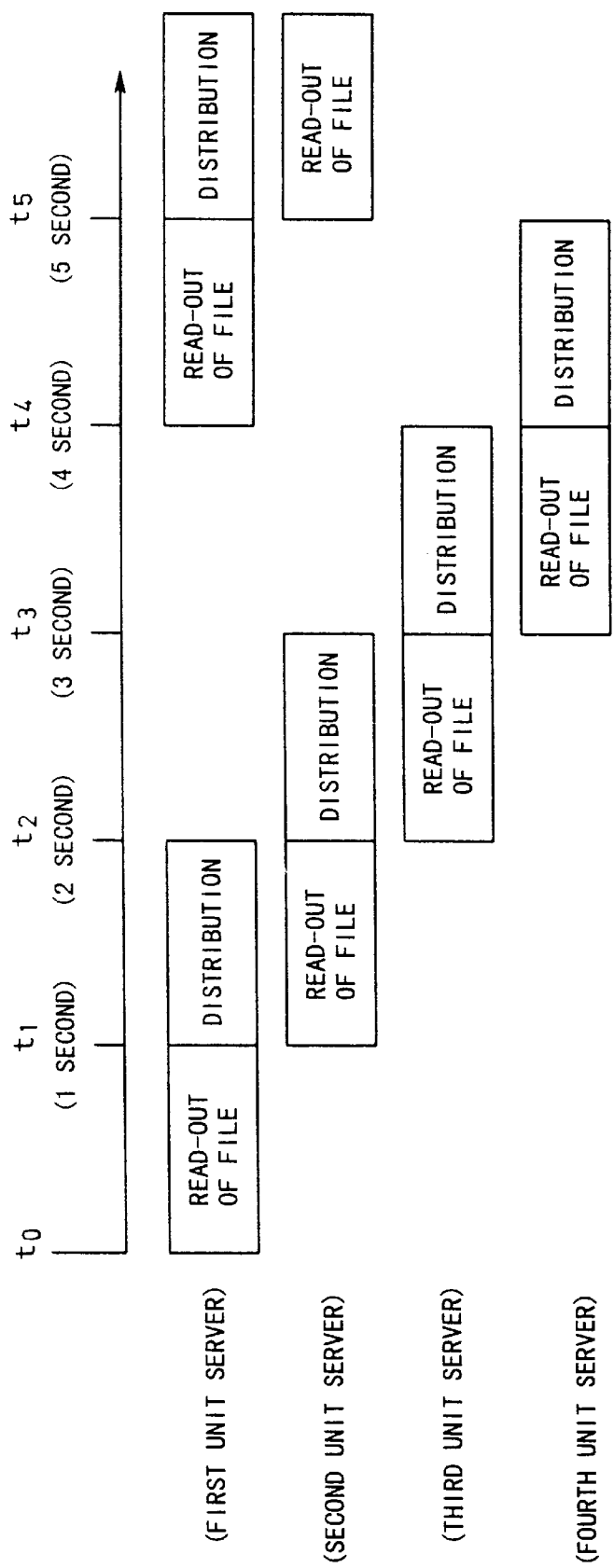
FIG. 3 is a timing chart illustrating a manner in which video data are distributed from the first to fourth unit servers shown in FIGS. 2(a) to 2(d) to a first client.

FIG. 3 illustrates a manner in which the video data are distributed from the first to fourth unit servers to the first client. In the manner illustrated in FIG. 3, it is assumed that one second is required in the maximum to read out the video data from each of the file apparatus $221_1$ to $221_4$ of the first to fourth unit servers $211_1$ to $211_4$ and store the read out data into a corresponding one of the buffers $223_1$ to $223_4$. If it is assumed that a request for distribution is received at time $t_0$ from the first client $202_1$, then the preparation sign reporting section $226_1$ in the first unit server $211_1$ reports a sign of reading out of a file to the file apparatus 221 at time $t_0$ which is preceding by one second to a distribution time. Then, when time $t_1$ after one second elapses comes, the distribution start sign reporting section $227_1$ in the first unit server $211_1$ reports a sign of start of distribution to the distribution section $224_1$, and distribution is started at this time $t_1$. This will be described in more detail.

First, a request for distribution is outputted from the first client $202_1$ and accepted by the relevant first to fourth unit servers $211_1$ to $211_4$. The acceptance of the request may be performed otherwise such that the request is first accepted directly by the first unit server $211_1$ in which the top portion of the video data is stored and then this is reported to the other second to fourth unit servers $211_2$ to $211_4$. Or else, a client request acceptance section for collectively accepting requests from the clients $202_1$ to $202_N$ may be provided independently on the network 203 or a particular one of the clients 202 may have the function of such client request acceptance section such that the client request acceptance section accepts requests for distribution and reports them to required ones of the unit servers 211.

After the request for distribution is accepted, the first to fourth unit servers $211_1$ to $211_4$ individually set distribution times. Here, since it is assumed that one second is required in the maximum for preparation of reading out of a unit of video data stored discretely, if the request is accepted at time to from the first client $202_1$, then the start time $t_1$ for distribution corresponding to the accepted request is the point of time elapsed by one second from time $t_0$. Thus, when the request for distribution is accepted at time $t_0$, the first unit server $211_1$ starts distribution at time $t_1$ elapsed by one section from time $t_0$.

Figure 4:
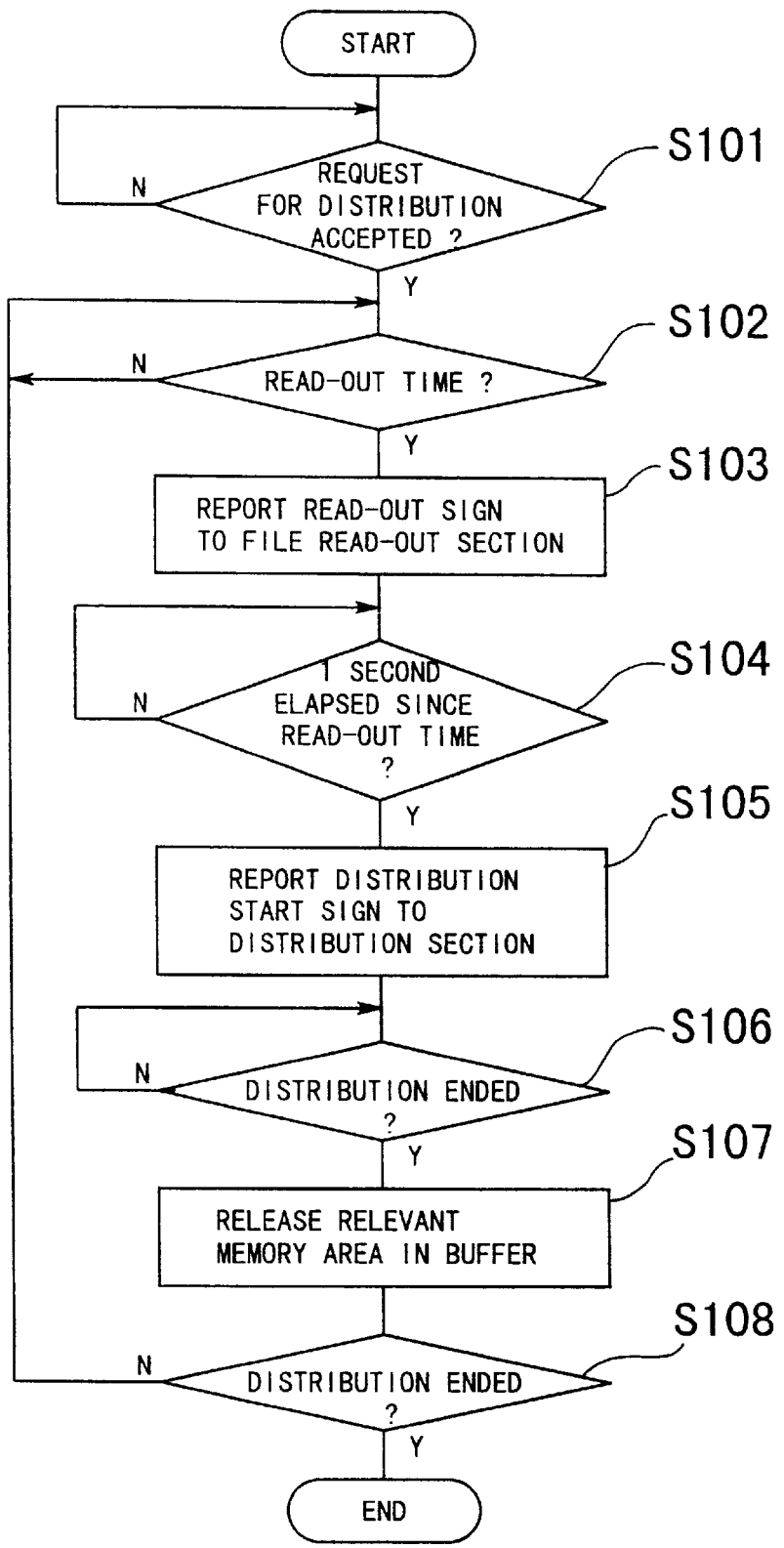
FIG. 4 is a flow chart illustrating contents of control for distribution of the first unit server shown in the video server of FIG. 1.

FIG. 4 illustrates a flow of such control of the first unit server as described above. Referring to FIG. 4, if the request for distribution is accepted at time $t_0$ (step S101; Y (Yes)), then the first unit server $221_1$ waits that the time at which video data are to be read out from the file apparatus $221_1$ of itself (step S102). Since distribution of video data is first performed by the first unit server $211_1$, the read time comes simultaneously with the acceptance of the request (step S102; Y). Thus, the preparation sign reporting section $226_1$ reports a read-out sign to the file read-out section $222_1$ (step S103). In response to the read-out sign, the file read-out section $222_1$ secures a memory area for video data for one second in the buffer $223_1$, reads out video data from the self file apparatus $221_1$ and stores the video data into the secured memory area.

The first unit server $211_1$ supervises that the time $t_1$ elapsed by one second after read-out time $t_0$ in step S102 comes (step S104), and when time $t_1$ comes (step S104; Y), the distribution start sign reporting section $227_1$ reports a sign of start of distribution to the distribution section $224_1$ (step S105). In response to the sign of start of distribution, the distribution section $224_1$ successively reads out the video data stored in the buffer $223_1$ from time $t_1$ and distributes the video data to the first client $202_1$ via the network 203. At a point of time when the distribution comes to an end (step S106; Y), the first unit server $211_1$ releases the memory area in the buffer $223_1$ used for the distribution (step S107). This allows storage of following video data. Then, it is checked whether or not the distribution of a series of video data to the first client $202_1$ is completed (step S108), and if the distribution is not completed as yet (step S108; N), then the control sequence returns to step S102, in which it is supervised that time $t_4$ illustrated in FIG. 3 comes. Thereafter, control for distribution is performed in a similar manner. Then, if the distribution for the series of video data is completed (step S103; Y), then the control is ended (End).

On the other hand, the second unit server $211_2$ develops a sign of reading out of a file at time $t_1$ as seen in FIG. 3, and then develops a sign of start of distribution at time $t_2$ elapsed by one second after time $t_1$. Further, the third unit server $211_3$ signs reading out of a file at time $t_2$ and signs start of distribution at time $t_3$ elapsed by one second after time $t_2$. The fourth unit server $211_4$ signs reading out of a file at time $t_3$ and signs start of distribution at time $t_4$ elapsed by one second after time $t_3$. Thereafter, control for distribution of video data is cyclically repeated by the first to fourth unit servers $211_1$ to $211_4$ in a similar manner. Contents of the control of the second unit servers $211_2$ to $211_4$ are similar to those of the control of the first unit server $211_1$ illustrated in FIG. 4 except that the time at which video data are to be read out is different individually.

Figure 5:
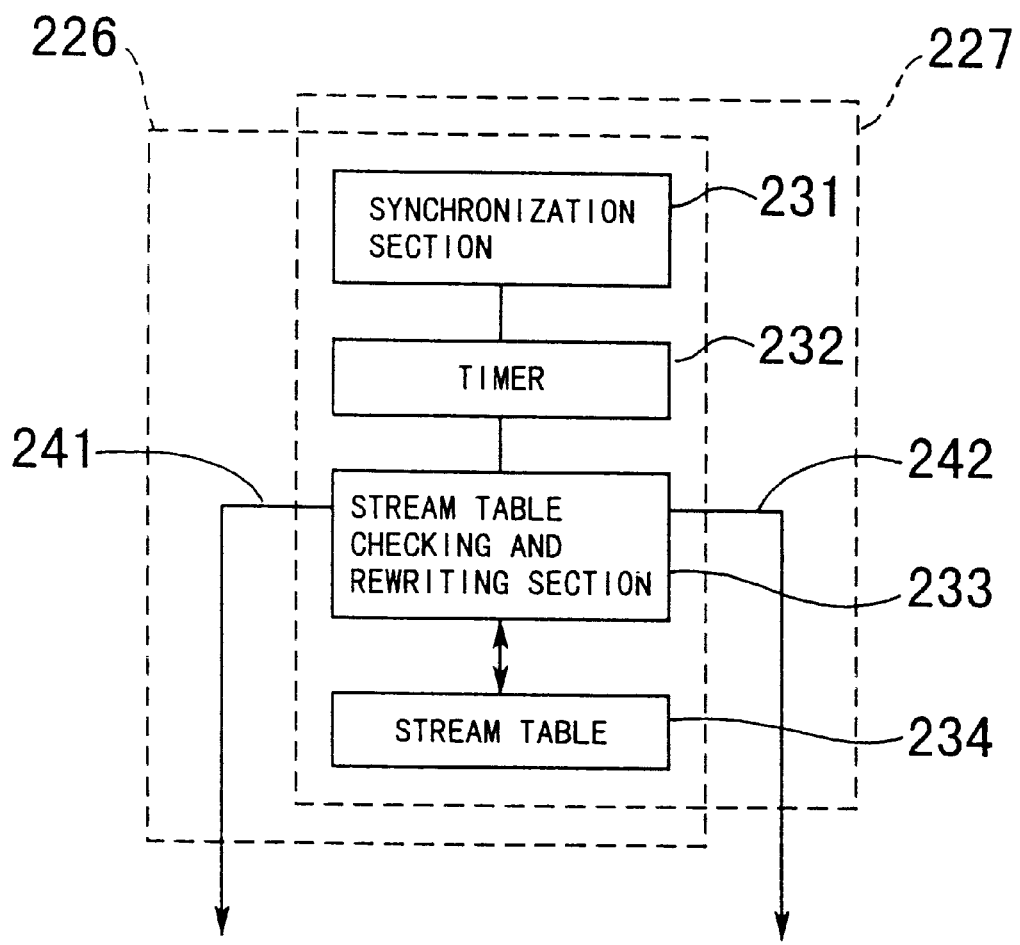
FIG. 5 is a block diagram showing a detailed construction of a preparation sign reporting section and a distribution start sign reporting section of the server of FIG. 1.

FIG. 5 shows the preparation sign notification means and the distribution start sign notification means where they are formed from hardware components. Referring to FIG. 5, the preparation sign reporting section 226 and the distribution start sign reporting section 227 are formed from common components. In particular, the preparation sign reporting section 226 and the distribution start sign reporting section 227 are formed from a synchronization section 231 for synchronizing the times of the unit servers $211_1$ to $211_M$ with each other, a timer 232 which is started at a time synchronized by the synchronization section 231, a stream table checking and rewriting section 233 which is interrupted each time the timer 232 counts up a predetermined time, and a stream table 234 connected to the stream table checking and rewriting section 233.

FIG. 6 shows an example of the stream table. The stream table 234 represents a relationship among the client number, the image number, the image block number, the read-out time and the distribution start time. Here, the client number is a number of a client which is a destination of distribution, and the image number is a number of an image to be distributed. The video block number is a number representing a distributed portion in an image. The read-out time is a time at which a sign of start of reading out is to be developed, and the distribution start time is a time at which a sign of start of distribution is to be developed.

Referring back to FIG. 5, the synchronization section 231 synchronizes the times of the unit servers $211_1$ to $211_M$ with each other at a common time so that the first to fourth unit servers $211_1$ to $211_M$ may distribute video data in correct order. Such synchronization can be realized by means of a hardware element for synchronization among the unit servers $211_1$ to $211_M$ so that a same clock signal generated by a clock generation circuit not shown is supplied commonly to the unit servers $211_1$ to $211_M$. Or, a software program for a network time protocol (ntp) or the like may be used to synchronize the unit servers $211_1$ to $211_M$ via the network 203.

The timer 232 generates an interruption to the stream table checking and rewriting section 233 after each predetermined interval of time beginning with a time at which synchronism is established by the synchronization section 231. The stream table checking and rewriting section 233 every time refers to the stream table 234 to check whether or not the present point of time has come to or passed a time described in the stream table 234. If it is assumed that the time of interruption processing is 18:10.21, then this is the same as the read-out time for the client number "381" in the stream table 234 shown in FIG. 6. Therefore, the preparation sign reporting section 226 reports a readout sign 241 to the file read-out section 222 so that video data of the read-out block "000" of the image number "001" may be read out.

Thereafter, the relevant unit server 211 ($211_1$ to $211_M$) rewrites the image block number of "000" to "004" and rewrites the read-out time described as "18:10.21" to "18:10.25" which is later by 4 seconds so that reading out of video data of the next image block number may be performed.

Further, the stream table checking and rewriting section 233 of the relevant unit server 211 performs checking of the stream table 234 each time an interruption is generated from the timer 232, and if the checked time comes to 18:10.22, then the stream table checking and rewriting section 233 discriminates that the distribution start time for the image block "000" of the client number "381" comes. Then, at this point of time, a distribute start sign 242 is sent out from the distribution start sign reporting section 227 to the distribution section 224. Also in this instance, the relevant unit server 211 rewrites the distribution start time from "18:10.22" to "18:10.26" which is later by 4 seconds so that control for starting distribution of video data of the next image block number may be performed similarly.

Modification

Figure 7:
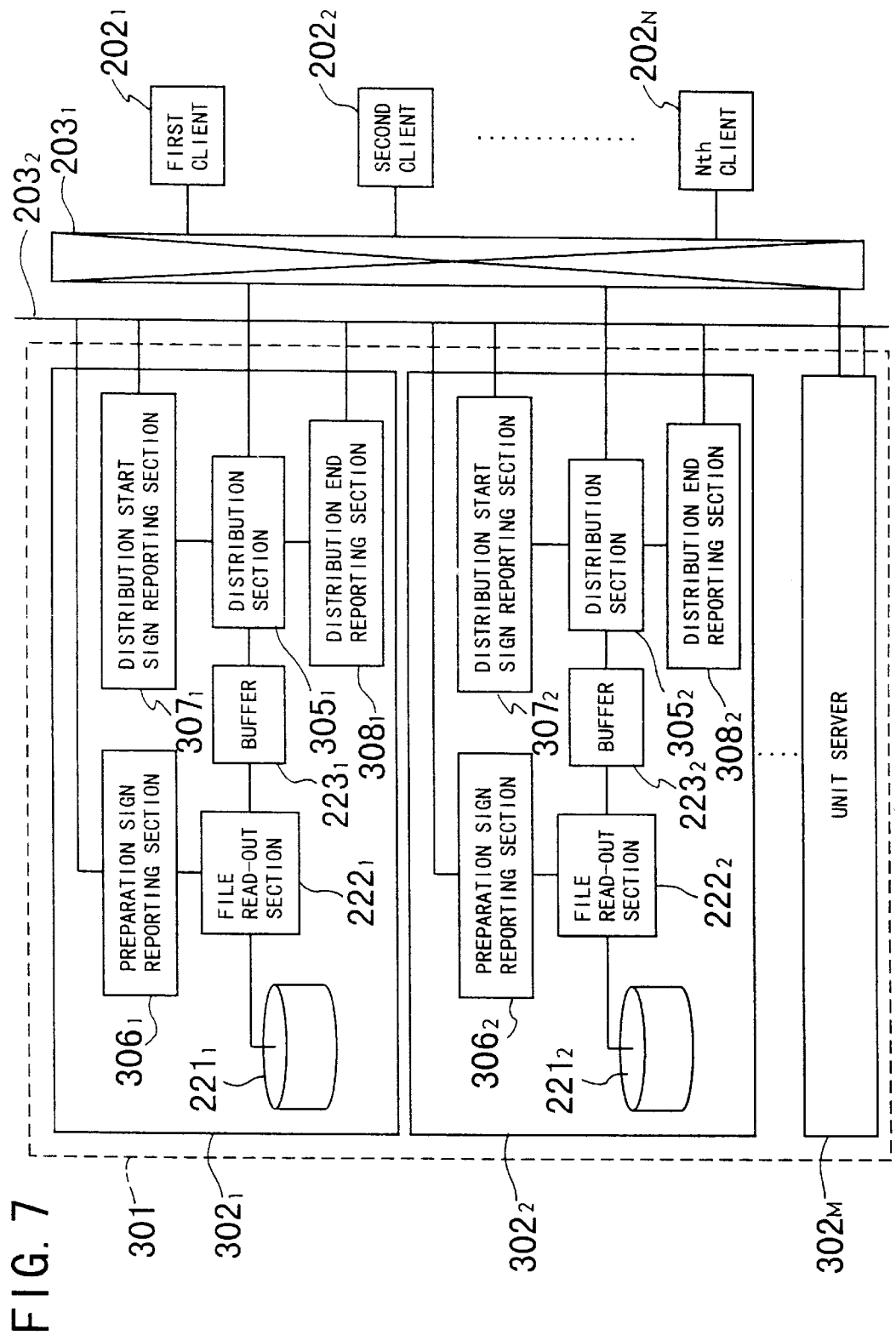
FIG. 7 is a block diagram showing a modification to the video server of FIG. 1 and an outline of a communication system employing the modified video server.
Figure 8:
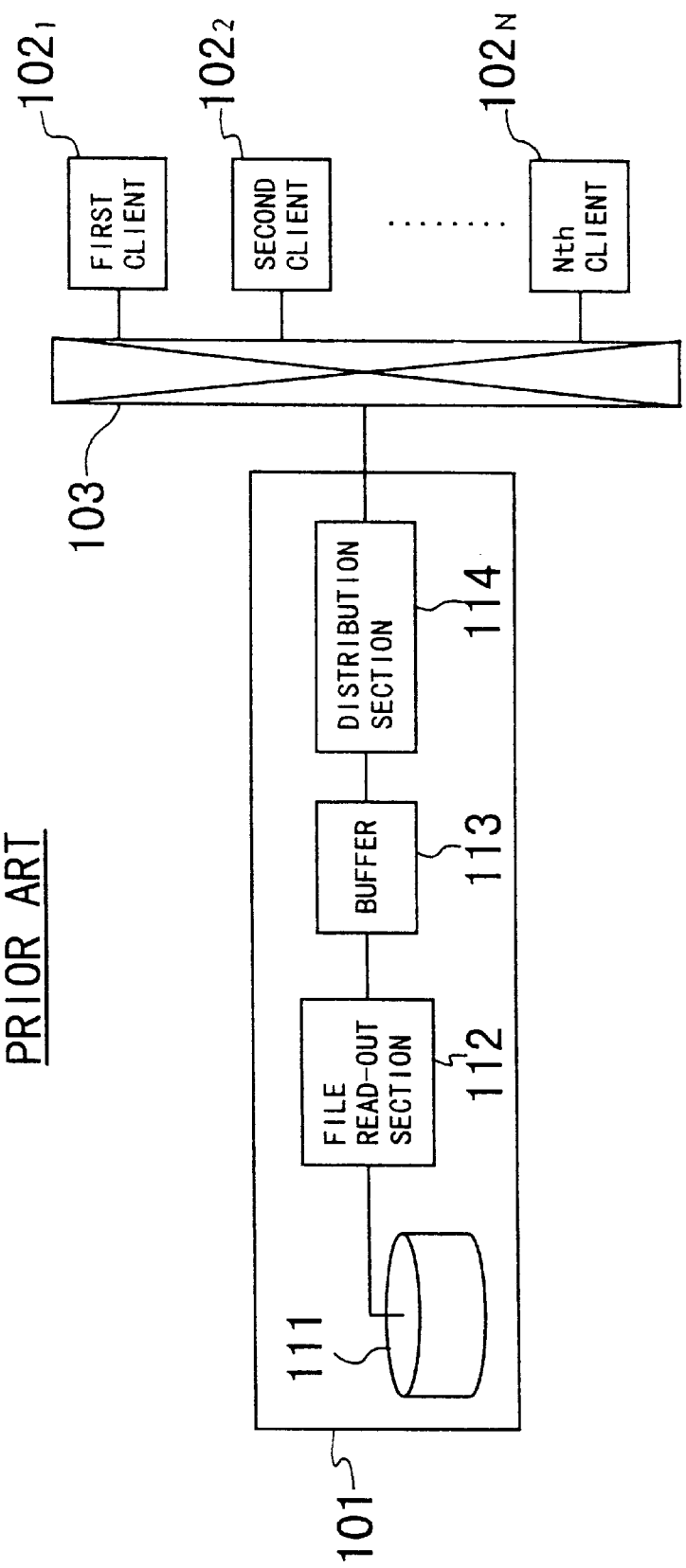
FIG. 8 is a block diagram showing a conventional communication system.
Figure 9:
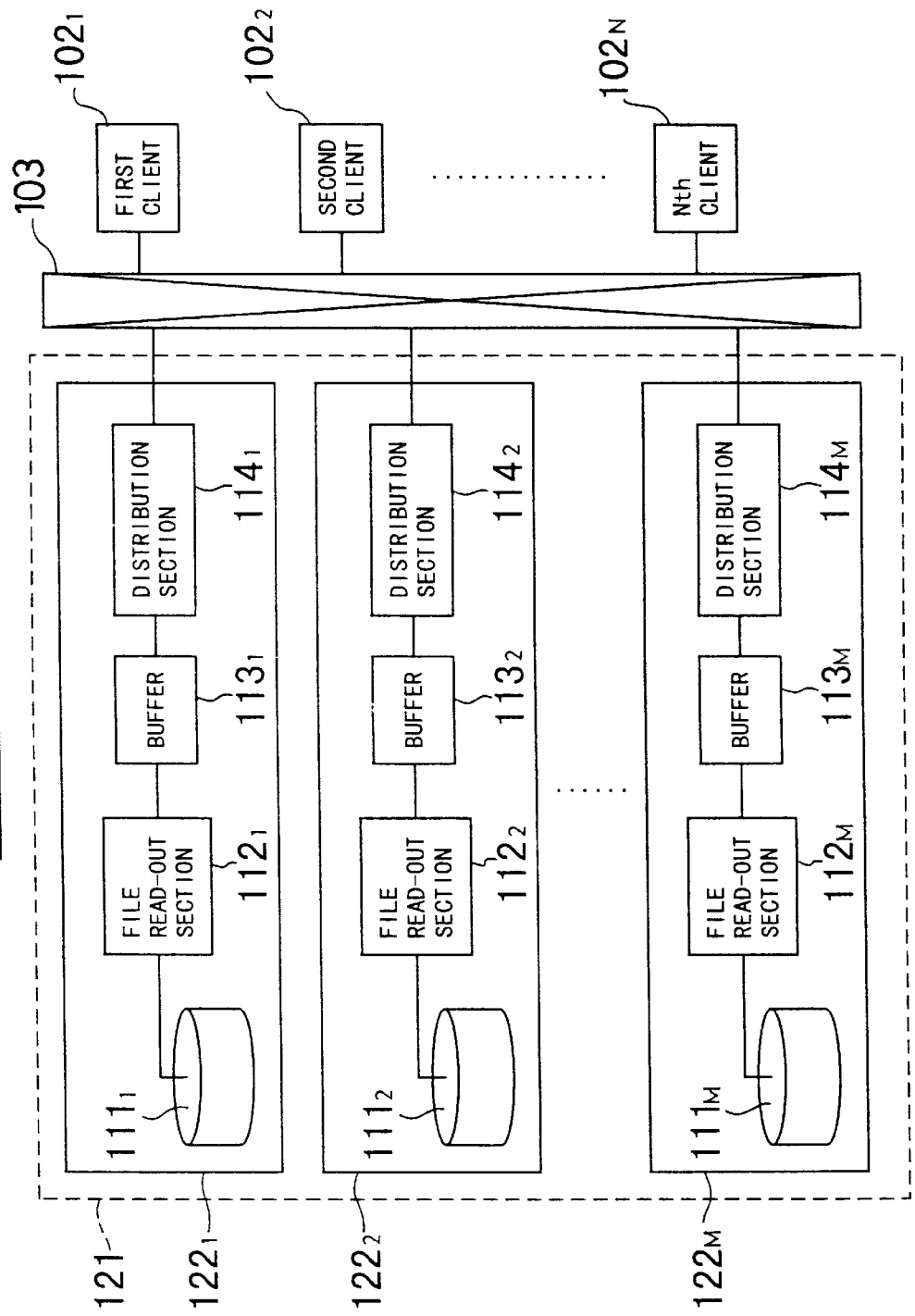
FIG. 9 is a block diagram showing another conventional communication system.

FIG. 7 shows a video server as a modification to the embodiment of the present invention described above and an outline of a communication system which employs the video server. Description of common elements of the modified video server and the communication system to those described hereinabove with reference to FIG. 1 is omitted herein to avoid redundancy. A video server 301 connected to a first network $203_1$ together with first to Nth clients $202_1$ to $202_N$ includes first to Mth unit servers $302_1$ to $302_M$. The first to Mth unit servers $302_1$ to $302_M$ have a same construction as each other and each includes a file apparatus 221 ($221_1$, $221_2$, . . . ) for storing video data. The file apparatus 221 is read out by a file read-out section 222 ($222_1$, $222_2$, . . . ) and temporarily stored into a buffer 223 ($223_1$, $223_2$, . . . ), whereafter it is sent out to the first network $203_1$ by a distribution section 305 ($305_1$, $305_2$, . . . ). A preparation sign reporting section 306 ($306_1$, $306_2$, . . . ) is connected to the file read-out section 222 so that a sign for preparation of read-out of the file apparatus 221 may be reported. Further, a distribution start sign reporting section 307 ($307_1$, $307_2$, . . . ) is connected to the distribution section 224 so that a sign of start of distribution of data to the first network $203_1$ may be reported. Furthermore, a distribution end reporting section 308 ($308_1$, $308_2$, . . . ) is connected to the distribution section 224 so that completion of distribution of the relevant unit server 302 ($302_1$ to $302_M$) may be reported.

While the present modified video server employs the first network $203_1$ which is a substantially same network as the network 203 in the embodiment described above, it further includes a second network $203_2$ connected to the preparation sign reporting sections 306, distribution start sign reporting sections 307 and distribution end reporting sections 308 of the unit servers $302_1$ to $302_M$. In particular, in the modified video server 301, the preparation sign reporting sections 306 and the distribution start sign reporting sections 307 receive a common clock signal via the second network $203_2$ to establish synchronism between them, and also a timing at which distribution is completed is sent out to the second network $203_2$.

In the description of the modified video server 301, several steps when a distribution request is accepted from any of the first to Nth clients $202_1$ to $202_N$ will be hereinafter referred to as initial steps, and the following steps after a steady state is thereafter entered will be hereinafter referred to as steady steps. Further, in the following description, an example wherein the first client $202_1$ develops a request for distribution similarly as in the embodiment described hereinabove and then the unit servers $302_1$ to $303_4$ cyclically distribute video data will be described.

If the first client $202_1$ develops a request for distribution, then the request is accepted by a relevant one of the first to fourth unit servers $302_1$ to $302_4$. In the initial steps, the preparation sign reporting section or sections 306 of a unit server or servers 302 set in advance develop a read-out preparation sign to the corresponding file read-out section or sections 222. In the present example, the preparation sign reporting section $226_1$ of the unit server $302_1$ and the preparation sign reporting section $226_2$ of the unit server $302_2$ output a read-out preparation sign to the corresponding file read-out sections $222_1$ and $222_2$, respectively.

In the unit server $302_1$, the file read-out section $222_1$ secures a memory area for video data for one second in the buffer $223_1$. Then, the file read-out section $222_1$ reads out the video data for one second from the file apparatus $221_1$ and stores the video data into the thus secured memory area of the buffer $223_1$.

When one second elapses after the request for distribution is accepted from the first client $202_1$, storage of the video data into the buffer $223_1$ comes to an end. Thus, in the initial steps, when one second elapses in this manner, the distribution start sign reporting section $307_1$ delivers a distribution start sign to the distribution section $305_1$. The operations up to this are the initial steps.

Then, a steady state is entered. In the steady state, the distribution section 3051 reads out, in response to the distribution start sign received from the distribution start sign reporting section $307_1$, the video data from the relevant memory area of the buffer $223_1$ and distributes the video data to the first client $202_1$ via the first network $203_1$. When the distribution of the video data of the image block number comes to an end, the first unit server $302_1$ releases the relevant memory area of the buffer $223_1$. Then, the unit server $302_1$ outputs a distribution end sign to the distribution end reporting section $308_1$. Upon reception of the distribution end sign, the distribution end reporting section $308_1$ reports the distribution end sign to the distribution start sign reporting section $307_2$ of the second unit server $302_2$ via the second network $203_2$. Simultaneously, the distribution end reporting section 308 reports the distribution end sign also to the preparation sign reporting section $306_3$ of the third unit server $302_3$.

Upon reception of the distribution end sign, the distribution start sign reporting section $307_2$ of the unit server $302_2$ distributes video data prepared already in the buffer $223_2$ to the first client $202_1$. Further, the preparation sign reporting section $306_3$ of the third unit server $302_3$ having received the distribution end sign reports, in response to the sign, a read-out preparation start sign to the file read-out means $222_3$ to start reading out of the relevant file of the file apparatus $221_3$. In this manner, in the modification described above, a distribution end sign is sent to one of the unit servers 302, which is to start distribution subsequently, using the second network $203_2$ so that distribution may be started. Consequently, successive image blocks of video data can be distributed successively without interruption from the first to fourth unit servers $302_1$ to $302_4$ to the first client $202_1$.

While the communication system which employs the modified server employs the first network $203_1$ for distribution of video data and employs the second network $203_2$ for reporting of a distribution end sign, the employment of the first network $203_1$ and the second network $203_2$ is intended to merely facilitate description, and countermeasures for distribution of video data and for reporting of a distribution end sign are not limited to the specific networks. For example, a single network which integrates the first and second networks $203_1$ and $203_2$ may be employed instead.

Further, the communication systems in which the servers of embodiment and the modification are employed presume that a logical network is provided in advance from the distribution section 224 or 305 of a unit server 211 or 302 to a client 202. However, if the number of unit servers 211 or 302 increases very much, then it may possibly become impossible to provide logical networks from one client 202 to all of the unit servers $211_1$ to $211_M$ or $302_1$ to $302_M$ in advance. In order to solve this, a logical network should be provided between the distribution section 224 or 305 and the client 202 when this becomes necessary. In addition, a logical network can be provided between the distribution section 224 or 305 and the client 202 when this becomes necessary if the preparation sign reporting section 226 or 306 reports a read-out preparation sign to the file read-out section 222 and also reports a distribution preparation sign to the distribution section 224 or 305.

Further, while the communication systems which employ the servers of the embodiment and the modification described above presume video data, naturally the present invention can be applied similarly also to transfer of any other continuous data.

Having now fully described the invention, it will be apparent to one of ordinary skill in the art that many changes and modifications can be made thereto without departing from the spirit and scope of the invention as set forth herein.

What is claimed is:

1. A server coupled to at least one client across a network, said server comprising:

a plurality of unit servers arranged to provide a continuous stream of data to said at least one client, said data comprising a file, said file being sequentially stored among said plurality of unit servers in discrete data units, each of said discrete data units having a predetermined amount of said data, each of said unit servers including:

a file apparatus in which a portion of said discrete data units are stored;

file read-out means for successively reading out said discrete data units from said file apparatus;

a buffer for temporarily storing said discrete data units read out by said file read-out means until transfer of said continuous stream of data ends;

transfer means for transferring said discrete data units stored in said buffer to a one of said at least one client from which a request for a corresponding file has been;

transfer start sign reporting means, said transfer start sign reporting means reporting, to said transfer means, a first time at which said continuous data stored in said file apparatus are to be transferred, based on an order in which said discrete data units are stored;

preparation sign reporting means, said preparation sign reporting means reporting a second time to said file read-out means at which the continuous data are to be read out from said file apparatus, said time being reported prior to starting the transfer of said continuous data by the unit such that a next discrete data unit being transferred may be stored in said buffer;

time synchronization means for synchronizing times of said unit servers with each other, said time synchronization means being included as part of said transfer start sign reporting means and said preparation sign reporting means, said transfer start sign reporting means and said preparation sign reporting means outputting their respective reports based on the synchronized time; and each of said discrete data units being sequentially stored across said unit servers in a cyclical arrangement such that said discrete data units are sequentially transferred from said unit servers to said requesting client.

2. A server coupled to at least one client across a network, said server comprising:

a plurality of unit servers arranged to provide a continuous stream of video data to said at least one client, said video data comprising a file, said file being sequentially stored among said plurality of unit servers in discrete data units of a predetermined data amount therein, each of said unit servers including:

a file apparatus in which a portion of said discrete data units are stored;

file read-out means for successively reading out the discrete data units from said file apparatus;

a buffer for temporarily storing said discrete data units read out by said file read-out means until distribution of said continuous stream of video data ends;

distribution means for distributing said discrete units data stored in said buffer to a one of said at least one client from which a request for a corresponding file has been;

distribution start sign reporting means, said distribution start sign reporting means reporting a first time at which said video data stored in said file apparatus are to be distributed, based on an order in which said discrete data units are stored;

preparation sign reporting means, said preparation sign reporting means reporting a second time to said file read-out means at which the video data are to be read out from said file apparatus, said time being reported prior to starting the distribution of said video data by the unit server such that a next discrete data unit being distributed may be stored in said buffer;

time synchronization means for synchronizing times of said unit servers with each other, said time synchronization means being included as part of said distribution start sign reporting means and said preparation sign reporting means, said distribution start sign reporting means and said preparation sign reporting means outputting their respective reports based on the synchronized time; and each of said discrete data units being sequentially stored across said unit server file apparatuses in a cyclical arrangement such that said discrete data units are sequentially transferred to said requesting client.

3. A server as claimed in claim 2, wherein said preparation sign reporting means and said distribution start sign reporting means further include:

a table in which at least one of said first time and said second time at which a report is to be outputted is described;

table checking means for checking said table after each predetermined interval of time based on the time synchronized by said time synchronization means;

report outputting means for outputting, when the time described in said table arrives, a relevant report; and description updating means for rewriting the description of said table to another time at which another report is to be outputted.

4. A server coupled to at least one client across a network, said server comprising:

a plurality of unit servers arranged to provide a continuous stream of video data to said at least one client, said video data comprising a file, said file being sequentially stored among said plurality of unit servers in discrete data units of a predetermined data amount therein, each of said unit servers including:

a file apparatus in which a portion of said discrete data units are stored;

file read-out means for successively reading out the discrete data units from said file apparatus;

a buffer for temporarily storing said discrete data units read out by said file read-out means until distribution of said continuous stream of video data ends;

distribution means for distributing said discrete units data stored in said buffer to a one of said at least one client from which a request for a corresponding file has been;

distribution start sign reporting means, said distribution start sign reporting means reporting a first time at which said video data stored in said file apparatus are to be distributed, based on an order in which said discrete data units are stored;

preparation sign reporting means, said preparation sign reporting means reporting a second time to said file read-out means at which the video data are to be read out from said file apparatus, said time being reported prior to starting the distribution of said video data by the unit server such that a next discrete data unit being distributed may be stored in said buffer;

distribution end notification means for reporting an end of distribution of said video data to the other unit servers;

said distribution start sign reporting means generating a distribution start sign to start distribution of said video data when an end of distribution is reported from the one of said unit servers which performs distribution immediately before said end; and each of said discrete data units being sequentially stored across said unit server file apparatuses in a cyclical arrangement such that said discrete data units are sequentially transferred to said requesting client.

5. A server as claimed in claim 4, wherein each of said unit servers further includes preparation sign notification means for reporting, when a report of an end of distribution is received from said distribution end reporting means of any other one of said unit servers, a timing at which the video data are to be read out from said file apparatus of said corresponding unit server from the time of the reception of the report, and second distribution start sign notification means for delivering, when a report of an end of distribution is received from said distribution end reporting means of any other one of said unit servers, a report to start distribution of the video data of the corresponding unit server from the time of the reception of the report.

6. A server coupled to at least one client across a network said server comprising:
   a plurality of unit servers arranged to provide a continuous stream of data to said at least one client, said data comprising a file, said file being sequentially stored among said plurality of unit servers in discrete data units, each of said discrete data units having a predetermined amount of said data, each of said unit servers including:
      a file apparatus in which a portion of said discrete data units are stored;
      a file read-out section for successively reading out said discrete data units from said file apparatus;
      a buffer for temporarily storing said discrete data units read out by said file read-out section until transfer of said continuous stream of data ends;
      a transfer section for transferring said discrete data units stored in said buffer to a one of said at least one client from which a request for a corresponding file has been received;
      a transfer start sign reporting section, said transfer start sign reporting section reporting, to said transfer section, a first time at which said continuous data stored in said file apparatus are to be transferred, based on an order in which said discrete data units are stored;
      a preparation sign reporting section, said preparation sign reporting section reporting a second time to said file read-out section at which the continuous data are to be read out from said file apparatus, said time being reported prior to starting the transfer of said continuous data by the unit server such that a next discrete data unit being transferred may be stored in said buffer;
      a time synchronization section, said time synchronization section synchronizing times of said unit servers with each other, said time synchronization section being included as part of said transfer start sign reporting section and said preparation sign reporting section, said transfer start sign reporting section and said preparation sign reporting section outputting their respective reports based on the synchronized time; and
   each of said discrete data units being sequentially stored across said unit servers in a cyclical arrangement such that said discrete data units are sequentially transferred from said unit servers to said requesting client.

7. A server coupled to at least one client across a network, said server comprising:
   a plurality of unit servers arranged to provide a continuous stream of video data to said at least one client, said video data comprising a file, said file being sequentially stored among said plurality of unit servers in discrete data units of a predetermined data amount therein, each of said unit servers including:
      a file apparatus in which a portion of said discrete data units are stored;
      a file read-out section for successively reading out the discrete data units from said file apparatus;
      a buffer for temporarily storing said discrete data units read out by said file read-out section until distribution of said continuous stream of video data ends;
      a distribution section for distributing said discrete units data stored in said buffer to a one of said at least one client from which a request for a corresponding file has been received;
      a distribution start sign reporting section, said distribution start sign reporting section reporting a first time at which said video data stored in said file apparatus are to be distributed, based on an order in which said discrete data units are stored;
      a preparation sign reporting section, said preparation sign reporting section reporting a second time to said file read-out section at which the video data are to be read out from said file apparatus, said time being reported prior to starting the distribution of said video data by the unit server such that a next discrete data unit being distributed may be stored in said buffer;
      a time synchronization section, said time synchronization section synchronizing times of said unit servers with each other, said time synchronization section being included as part of said distribution start sign reporting section and said preparation sign reporting section, said distribution start sign reporting section and said preparation sign reporting section outputting their respective reports based on the synchronized time; and
   each of said discrete data units being sequentially stored across said unit servers in a cyclical arrangement such that said discrete data units are sequentially transferred from said unit servers to said requesting client.

8. A server as claimed in claim 7, wherein said preparation sign reporting section and said distribution start sign reporting section further include:
   a table in which at least one of said first time and said second time at which a report is to be outputted is described;
   a table checking section for checking said table after each predetermined interval of time based on the time synchronized by said time synchronization section;
   a report outputting section for outputting, when the time described in said table arrives, a relevant report; and
   a description updating section for rewriting the description of said table to another time at which another report is to be outputted.

9. A server coupled to at least one client across a network, said server comprising:
   a plurality of unit servers arranged to provide a continuous stream of video data to said at least one client, said video data comprising a file, said file being sequentially stored among said plurality of unit servers in discrete data units of a predetermined data amount therein, each of said unit servers including:
      a file apparatus in which a portion of said discrete data units are stored;
      a file read-out section for successively reading out the discrete data units from said file apparatus;
      a buffer for temporarily storing said discrete data units read out by said file read-out section until distribution of said continuous stream of video data ends;
      a distribution section for distributing said discrete units data stored in said buffer to a one of said at least one client from which a request for a corresponding file has been received;
      a distribution start sign reporting section, said distribution start sign reporting section reporting a first time at which said video data stored in said file apparatus are to be distributed, based on an order in which said discrete data units are stored;

a preparation sign reporting section, said preparation sign reporting section reporting a second time to said file read-out section at which the video data are to be read out from said file apparatus, said time being reported prior to starting the distribution of said video data by the unit server such that a next discrete data unit being distributed may be stored in said buffer;

a distribution end notification section for reporting an end of distribution of said video data to the other unit servers;

said distribution start sign reporting section generating a distribution start sign to start distribution of said video data when an end of distribution is reported from the one of said unit servers which performs distribution immediately before said end; and each of said discrete data units being sequentially stored across said unit server file apparatuses in a cyclical arrangement such that said discrete data units are sequentially transferred to said requesting client.

10. A server as claimed in claim 9, wherein each of said unit servers further includes:

a preparation sign notification section for reporting, when a report of an end of distribution is received from said distribution end reporting section of any other one of said unit servers, a timing at which the video data are to be read out from said file apparatus of said corresponding unit server from the time of the reception of the report; and a second distribution start sign notification section for delivering, when a report of an end of distribution is received from said distribution end reporting section of any other one of said unit servers, a report to start distribution of the video data of the corresponding unit server from the time of the reception of the report.

* * * * *